Sept. 16, 1930.        P. W. YETT              1,775,745
        METHOD OF AND APPARATUS FOR CHARGING CONCRETE MIXERS
                Filed Oct. 17, 1928      3 Sheets-Sheet 1
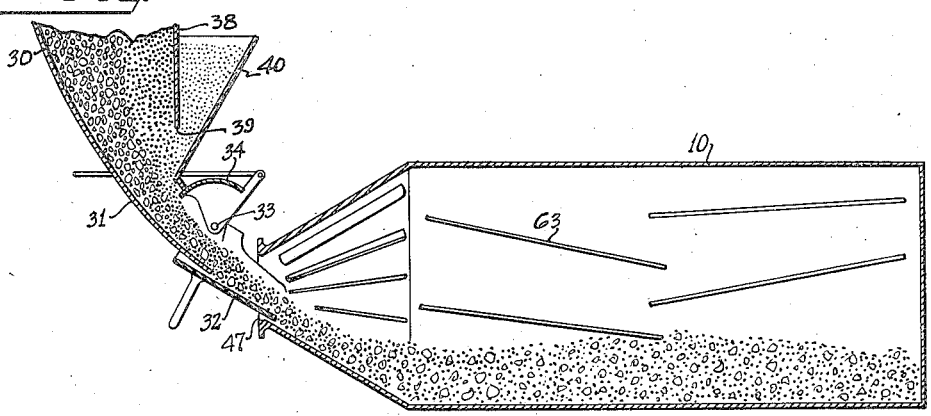
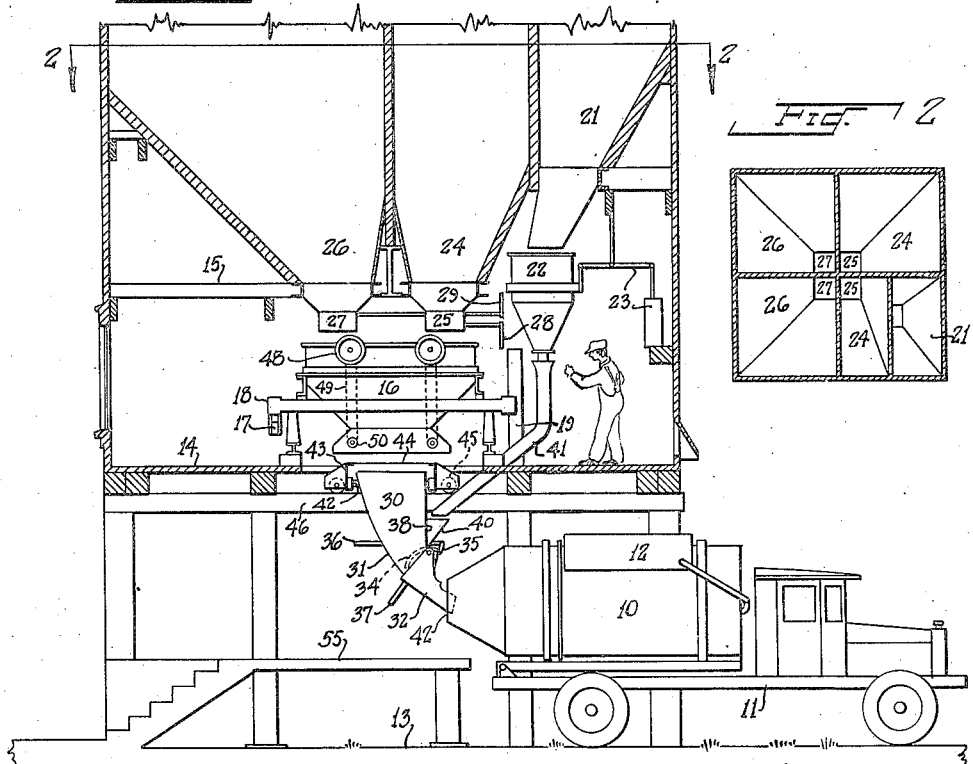
INVENTOR
P. W. Yett
BY C. B. Birkenbeuel
ATTORNEY Sept. 16, 1930.  P. W. YETT  1,775,745
METHOD OF AND APPARATUS FOR CHARGING CONCRETE MIXERS
Filed Oct. 17, 1928  3 Sheets-Sheet 2
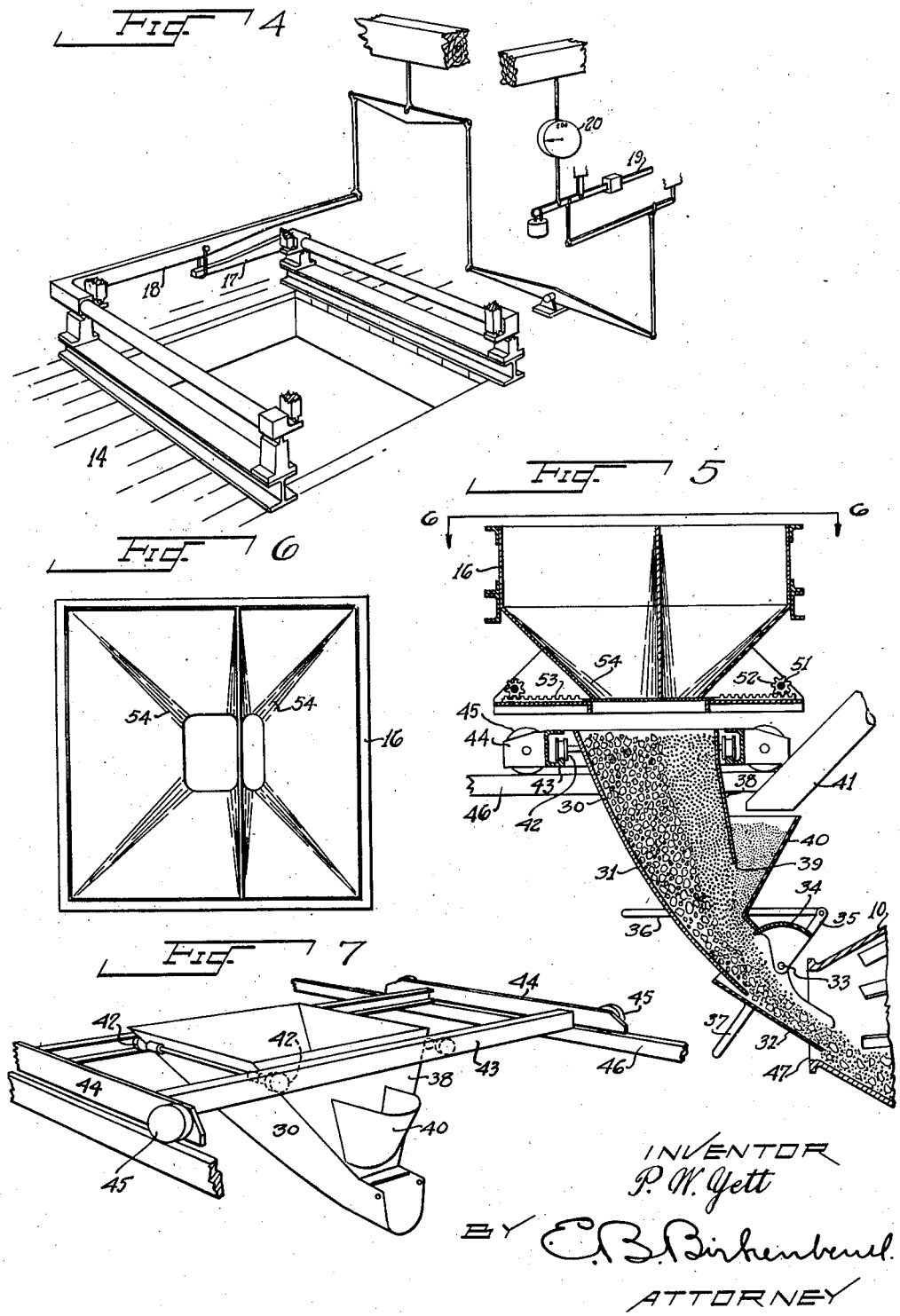
INVENTOR
P. W. Yett
BY C. B. Birkenbeuel
ATTORNEY Sept. 16, 1930. P. W. YETT 1,775,745
METHOD OF AND APPARATUS FOR CHARGING CONCRETE MIXERS
Filed Oct. 17, 1928 3 Sheets-Sheet 3
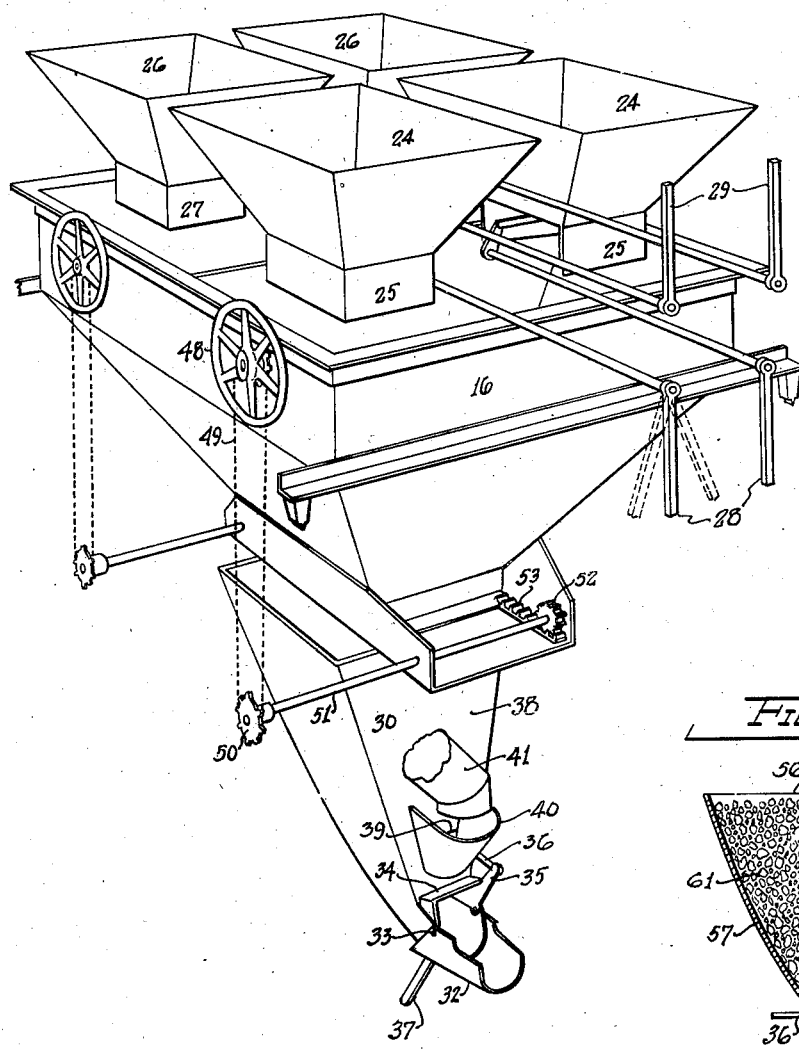
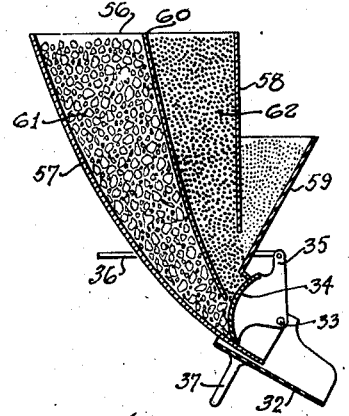
INVENTOR
P. W. Yett
BY C. B. Birkenbeuel.
ATTORNEY Patented Sept. 16, 1930

1,775,745

UNITED STATES PATENT OFFICE

PORTER W. YETT, OF PORTLAND, OREGON

METHOD OF AND APPARATUS FOR CHARGING CONCRETE MIXERS

Application filed October 17, 1928. Serial No. 313,014.

This invention relates generally to concrete mixing machines, and particularly to charging devices therefor.

The main object of this invention is to provide an exceedingly simple and efficient form of charging device whereby dry materials can be assembled and placed in the mixer in a thoroughly distributed form and in a uniform manner along the entire length of the mixer.

The second object is to make it practical to assemble and prepare a dry mix at a central distributing point and complete the mixing and wetting operations in transit.

The third object is to make it possible to so assemble the component parts of the concrete as to render same sufficiently plastic for the purpose intended with the employment of only a minimum amount of water.

The fourth object is to construct a charging machine which will make it unnecessary to introduce the water into the mix until just before the concrete is delivered to the forms allowing only sufficient time to accomplish the wet mixing operation.

The fifth object is to provide a charger for concrete mixers having cylinders of relatively great length as compared with their diameters.

The sixth object is to provide a charging apparatus whereby there will be a complete uniformity of distribution of the ingredients without the employment of an objectionable amount of water.

These, and other objects, will become more apparent from the specification following as illustrated in the accompanying drawings, in which:

Fig. 1 is a vertical section through the charger. Figure 2 is a section taken along the line 2—2 in Figure 1. Figure 3 is a longitudinal section through the lower portion of the charging hopper and the mixer being charged. Figure 4 is a perspective view of a weighing mechanism. Figure 5 is a vertical section through the weighing hopper and the movable hopper. Figure 6 is a plan of the weighing hopper taken along the line 6—6 in Figure 5. Figure 7 is a perspective view of the lower hopper on its traveling carriage. Figure 8 is a perspective view of the bin hoppers, weighing hopper and movable hopper. Figure 9 is a section through an alternative form of movable hopper adapted to small outfits.

Similar numbers of reference refer to similar parts throughout the several views.

Before entering into an explanation of this invention it will be understood that it is especially adapted for use in connection with that type of concrete mixer in which the mixing cylinder 10 is relatively long and of narrow diameter and is mounted on a motor truck 11, which mixes the aggregate first dry and then with water from the tank 12 in transit.

Ordinarily concrete mixers having relatively short length and large diameter present no difficulties caused by the insertion of the materials therein, either in the manner in which they are inserted or in the order in which they are inserted, but with cylinders of increased length it is necessary to either thoroughly distribute the various ingredients before charging the cylinder 10, or to add sufficient water to form a very thin mix which will allow same to float along the length of the cylinder. This, of course, is extremely objectionable owing to its effect on the concrete. To overcome this difficulty there is constructed a special form of charging hopper which will now be described.

It is desirable to provide a three story structure, the ground floor 13 being the roadway upon which operate the trucks 11. The second floor 14 is the operating room and the third floor 15 carries the supply of bins or hoppers.

It will be understood that where the quality of the concrete is important it is desirable to weigh the various ingredients of each batch made and for this purpose there is provided a weighing hopper 16 whose beams 17 and 18 are linked up to the weighing beam 19, preferably attached to an indicating dial 20. These devices are in common use, it being the practice to weigh sand and gravel in the same hopper, the first ingredient inserted being merely subtracted from the weight when the latter is added, the subtraction of course being accomplished by the positioning of the weights on the beam 19.

The cement is preferably stored in a hopper 21 from which it is permitted to flow to the weighing hopper 22, having its own weighing mechanism 23; whereas the sand is carried in a hopper 24 whose outlet 25 is directly over the weighing hopper 16. The gravel is carried in the hopper 26 whose outlet 27 is also over the weighing hopper 16. The flow of sand from the hopper 24 is controlled by a lever 28, and the flow of gravel from the hopper 26 is controlled by the lever 29.

Underneath the weighing hopper 16 is the movable charging hopper 30 whose side 31 is shaped approximately as illustrated in Figure 5. The discharge end of the hopper 31 has a spout 32 hinged thereto on the pin 33, which also acts as a pivot for the curved gate 34 adapted to close the discharge end of the hopper 31, either partially or wholly as desired, under the control of the lever 35 to which is attached the rod 36 for the purpose of making same more accessible to the operator.

The spout 32 is provided with a lever 37 by means of which its inclination can be varied. The side 38 of the hopper 30 is provided with an inlet opening 39 around which is formed a pocket 40 into which cement enters from the cement weighing hopper 22 by way of the chute 41. The hopper 30 is supported by the rolls 42 on the tracks 43 of a movable platform whose ends 44 are provided with rolls 45 which ride on the stationary tracks 46.

This arrangement makes it possible to correctly position the spout 32 with relation to the mouth 47 of the cylinder 10. The contents of the weighing hopper 16 are permitted to escape into the movable hopper 30 under the control of the hand wheels 48, which, through the chains 49, rotate the sprockets 50 on the shaft 51, whose pinions 52 mesh with a rack 53 which, in turn, is connected to the gate (not shown).

It is highly desirable that the corners 54 of the various hoppers be rounded (as shown in Figure 6) to prevent the lodgment of materials therein.

The operation of the apparatus is as follows: Assuming that a supply of sand, gravel and cement is carried in the various hoppers 21, 24 and 26, and that the operator has received an order for a definite quantity of aggregate, his first step is to weigh out on his scale the various proportions, which he allows to enter into the hopper 30 in the following order: First the gravel, then the sand and then the cement, which he allows to enter into the hopper 30 in the following manner, namely with the gravel and sand entering together, the gravel being next to the side 31 and the sand next to the side 38, while the cement is deposited within the pocket 40. It will be understood that the gate 34 is closed, thus confining the various materials within the movable hopper 30.

The truck 11 is now backed into position as nearly as possible and the spout 32 is then inserted into the mouth 47 by shifting the position of the hopper 30, which is made easily possible owing to its rolls 42 and 45. The operator then opens the gate 34 by means of the rod 36, and, standing on the platform 55, is able to look into the mouth 47 and observe the manner in which the materials are entering same, it being understood that the cylinder 10 is being rotated while it is receiving its charge, the resulting action being that the gravel which forms the lowermost stratum of the moving materials slides the easiest and acts as a conveyor for the sand above same, which gradually trickles through the gravel as it moves toward the cylinder 10. The same is true of the cement which enters as a top stratum and gradually works its way downward around the sand and gravel, so that by the time the three ingredients have entered the cylinder 10 they are quite thoroughly distributed, the gravel, of course, having acted as a conveyor for the less readily movable sand and cement.

In the form of the device shown in Figure 9 the hopper 56 is provided with the curved under side 57 and the straight opposite side 58 which carries the cement pocket 59. This form of the device differs from the one described above only in the respect that no weighing device is employed, but a dividing partition 60 is placed in the hopper 56 between the sides 57 and 58, forming two compartments 61 and 62, the former for gravel and the latter for sand. The closing gate 34 and spout 32 are the same as previously described. This form of the device is especially useful in connection with small mixers in which the use of a weighing apparatus is not necessary or warranted.

In Figure 3 it will be seen that the various ingredients occupy the movable hopper 30 in fairly well defined strata, but as they enter the mixing cylinder 10 they are distributed along the length of the cylinder in uniform manner so that subsequent rotation of the cylinder will thoroughly dry mix the entire mass, and that the relative proportions of the various ingredients will be uniform throughout the entire length thereof.

It will be noted in Figure 3 that the cylinder 10 is provided with a number of flights 63 which are so positioned as to continually move the aggregate toward the middle of the length of the cylinder 10. If the various ingredients did not enter the cylinder 10 in a proportional relation it is obvious that they would never reach that state unless large quantities of water were admitted, which would permit the aggregate to flow and, as above stated, this would be objectionable, for well known reasons.

It is, of course, easily understood that while there is employed certain mechanical elements for the purpose of accomplishing my purpose, that the details thereof may be varied greatly without departing from the spirit of this invention.

It will be appreciated that one of the main reasons for the difficulties encountered in the charging of concrete mixers by gravity is the unequal rate of flow of the various ingredients over a given slope, for example, the cement tending to cling to the metal in the chute and refusing to flow at all at a slope which would permit gravel to move very freely. It is for this reason that I have chosen to employ the gravel as the vehicle for transporting the less mobile ingredients to the interior of the mixer.

I claim:

1. A method of mixing concrete in elongated cylinders consisting of weighing the various ingredients used, then sliding the gravel into a mixer after the sand and cement have been deposited upon said gravel in a manner to employ said gravel as a vehicle, then mixing the various kinds of material, then distributing the materials along the length of a cylinder and mixing same therein, and then watering and further agitating said mix until the desired consistency is attained.

2. An apparatus for charging concrete mixers consisting of a plurality of elevated storage hoppers for confining gravel, sand and cement separately, a weighing hopper under said storage hoppers in which definite proportions of aggregate can be assembled, a charging hopper under said weighing hopper having a curved under side along which gravel from said weighing hopper must pass, and means for introducing the sand and cement into said charging hopper in a manner that they shall ride upon said gravel as they pass through said charging hopper.

3. A charging hopper for concrete mixing machines having a sloping under side along which gravel can pass into said mixer, means for admitting sand and cement into said charging hopper on the upper side of said charging hopper, and means for controlling the speed at which said materials can flow from said discharge hopper.

4. An apparatus for charging concrete mixers with dry aggregate consisting of a charging hopper capable of longitudinal and transverse movement, said charger having a curved under side, an adjustable discharge spout forming an extension for said curved side, and a closure for the outlet end of said hopper.

5. A charging hopper having a curved side and having an adjustable spout forming an extension for said curved side, means for closing the discharge end of said hopper, a carriage for supporting said hopper permitting longitudinal and transverse movement, a weighing hopper, means above said charging hopper wherein weighed portions of gravel, sand and cement may be held in segregated order, closure means at the lower end of said weighing hopper for releasing the contents thereof into the charging hopper, and storage hoppers above said weighing hopper where separate supplies of gravel, sand and cement may be stored.

6. A charging hopper having a laterally curving funnel shaped member provided with movable supports, a spout hinged to the lower side of said hopper forming a continuation of the under side of said curved member, and a swinging gate forming a closure for said charging hopper consisting of a curved plate pivotally mounted on the radius of the curve and adapted to be swung across the outlet of said charging hopper.

PORTER W. YETT.